US012666274B2

(12) United States Patent (10) Patent No.: US 12,666,274 B2
Arora et al. (45) Date of Patent: Jun. 23, 2026

(54) PROACTIVE CONFIGURATION AUDITING IN O-RAN

(71) Applicant: Dell Products L.P., Round Rock, TX (US)

(72) Inventors: Vikas Arora, Ottawa (CA); Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 975 days.

(21) Appl. No.: 17/812,200

(22) Filed: Jul. 13, 2022

(65) Prior Publication Data

US 2024/0022923 A1 Jan. 18, 2024

(51) Int. Cl.
*H04W 24/02* (2009.01)
*H04L 41/0873* (2022.01)
*H04W 24/08* (2009.01)

(52) U.S. Cl.
CPC ......... *H04W 24/02* (2013.01); *H04L 41/0873* (2013.01); *H04W 24/08* (2013.01)

(58) Field of Classification Search
CPC .. H04W 24/02; H04W 24/08; H04L 41/0873; H04L 41/0813; H04L 41/0893; H04L 41/0895; H04L 41/145; H04L 41/147; H04L 43/08; H04L 41/0853; H04L 41/16; H04L 43/16; H04L 43/20
See application file for complete search history.

(56) References Cited

U.S. PATENT DOCUMENTS

| | | | | |
|---|---|---|---|---|
| 11,337,131 B1 * | 5/2022 | Parekh | ................... | H04W 36/22 |
| 11,477,300 B1 * | 10/2022 | Vasamsetti | .......... | H04L 41/5025 |
| 11,838,787 B2 * | 12/2023 | Lo | ........................ | H04L 41/5009 |
| 2014/0372805 A1 * | 12/2014 | Rijnders | ............ | H04L 41/5074 |
| | | | | 714/37 |
| 2020/0329381 A1 * | 10/2020 | Chou | .................... | H04W 24/02 |
| 2021/0235277 A1 * | 7/2021 | Parekh | .................. | H04W 16/14 |

(Continued)

OTHER PUBLICATIONS

Kurt et al. U.S. Appl. No. 63/228,481, filed Aug. 2, 2021 (Year: 2021).*

(Continued)

*Primary Examiner* — Wutchung Chu
(74) *Attorney, Agent, or Firm* — Amin, Turocy & Watson, LLP

(57) ABSTRACT

Technology described herein can employ dynamically changing network variables and/or context, in realtime, to determine one or more possible contexts that can lead to network function (NF) misconfiguration, NF mismatch and/or key performance indicator (KPI) degradation. In an embodiment, an example system can comprise a processor, and a memory that stores executable instructions that, when executed by the processor, facilitate performance of operations, comprising determining a working configuration of a network function, and detecting a misconfiguration between a specified configuration and the working configuration of the network function, wherein the detecting is based on a context known to be associated with the misconfiguration. Analysis of context can comprise analyzing, based on an artificial intelligence model, the contexts of the network function as compared to known and/or stored contexts.

17 Claims, 13 Drawing Sheets

(56) References Cited

U.S. PATENT DOCUMENTS

| | | | | |
|---|---|---|---|---|
| 2021/0235473 | A1* | 7/2021 | Parekh | H04W 72/542 |
| 2022/0255817 | A1* | 8/2022 | Hong | G06N 20/00 |
| 2022/0345419 | A1* | 10/2022 | Metsch | H04L 47/762 |
| 2023/0047057 | A1* | 2/2023 | Kurt | H04L 41/145 |
| 2023/0155648 | A1* | 5/2023 | Weil | H04B 7/0413 |
| | | | | 375/267 |
| 2023/0164759 | A1* | 5/2023 | Guchhait | H04B 7/0695 |
| | | | | 370/328 |
| 2023/0261954 | A1* | 8/2023 | Vasas | H04L 43/024 |
| | | | | 370/241 |
| 2023/0337268 | A1* | 10/2023 | Song | H04W 16/14 |
| 2024/0022923 | A1* | 1/2024 | Arora | H04W 24/02 |
| 2024/0121049 | A1* | 4/2024 | Jeong | H04L 5/0048 |
| 2024/0155363 | A1* | 5/2024 | Tsukamoto | H04W 24/02 |
| 2024/0224065 | A1* | 7/2024 | Xin | H04W 16/22 |
| 2024/0259879 | A1* | 8/2024 | Ranganath | G06N 5/01 |
| 2024/0396789 | A1* | 11/2024 | Luthra | G06F 11/0709 |
| 2024/0422063 | A1* | 12/2024 | Somanahalli Krishna Murthy | |
| | | | | H04L 41/0893 |
| 2025/0016053 | A1* | 1/2025 | Dell'aera | H04L 41/0894 |
| 2025/0106647 | A1* | 3/2025 | Pateromichelakis | H04W 24/06 |
| 2025/0175852 | A1* | 5/2025 | Vasas | H04W 28/0289 |
| 2025/0219919 | A1* | 7/2025 | Kumar | G06N 20/00 |

OTHER PUBLICATIONS

Ranganath et al. U.S. Appl. No. 63/281,204, filed Nov. 19, 2021 (Year: 2021).*

O-ran.org, "O-Ran Alliance," https://www.o-ran.org, Retrieved from the Internet: May 17, 2022.

O-RAN Alliance e.V., "O-RAN.WG1.0-RAN-Architecture-Description-v06.00," Publication Date: Mar. 1, 2022.

3GPP, "TS 32.422 Subscriber and equipment trace; Trace control and configuration management," https://www.etsi.org/deliver/etsi_ts/132400_132499/132422/16.04.00_60/ts_132422v160400p.pdf, Jan. 1, 2021.

3GPP, "TS 32.423 Subscriber and equipment trace; Trace data definition and management," https://www.etsi.org/deliver/etsi_ts/132400_132499/132423/15.00.00_60/ts_132423v150000p.pdf, Jun. 1, 2018.

* cited by examiner

500

600

700

Figure 10:
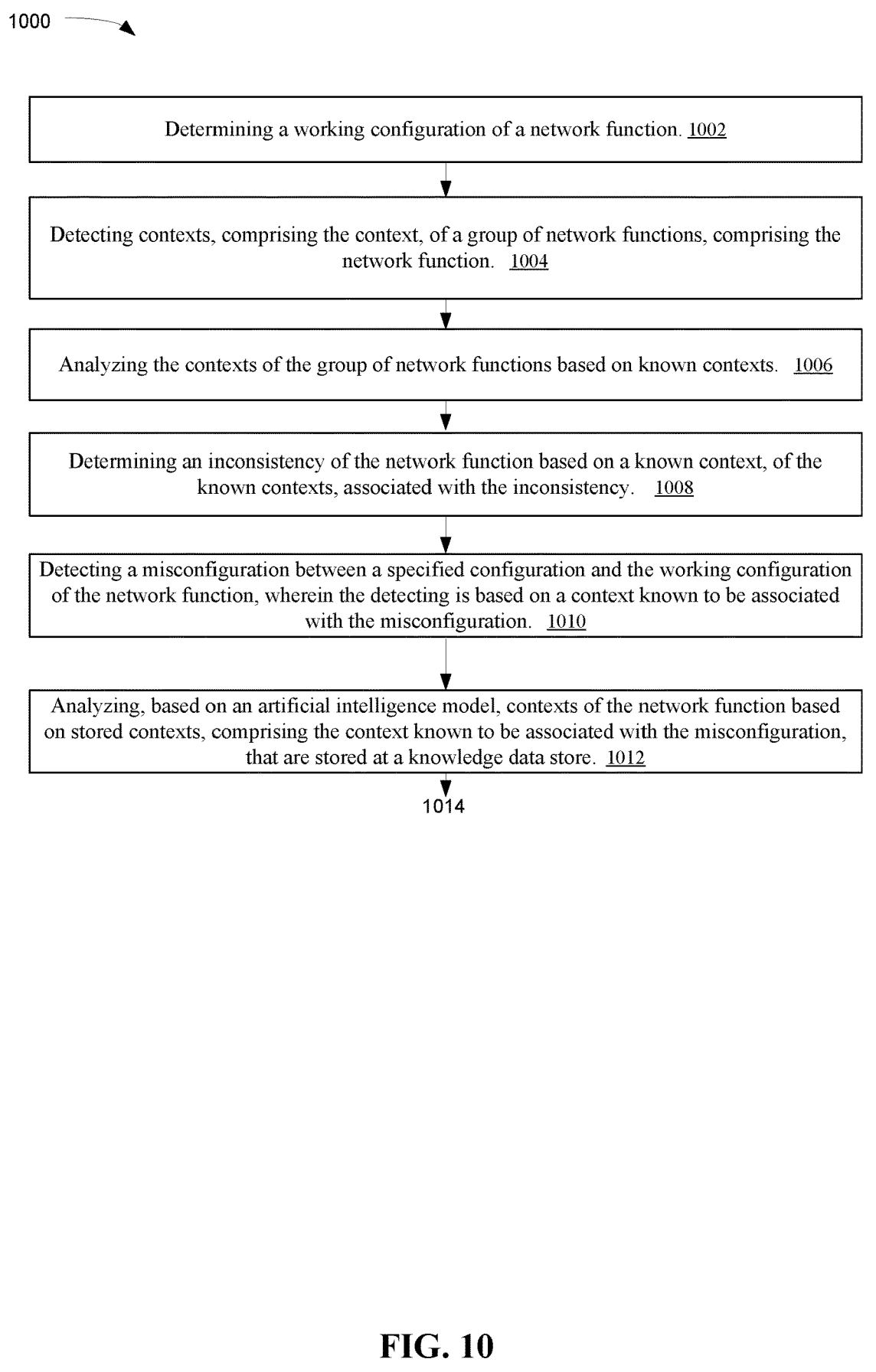

1000

Determining a working configuration of a network function. 1002

Detecting contexts, comprising the context, of a group of network functions, comprising the network function. 1004

Analyzing the contexts of the group of network functions based on known contexts. 1006

Determining an inconsistency of the network function based on a known context, of the known contexts, associated with the inconsistency. 1008

Detecting a misconfiguration between a specified configuration and the working configuration of the network function, wherein the detecting is based on a context known to be associated with the misconfiguration. 1010

Analyzing, based on an artificial intelligence model, contexts of the network function based on stored contexts, comprising the context known to be associated with the misconfiguration, that are stored at a knowledge data store. 1012

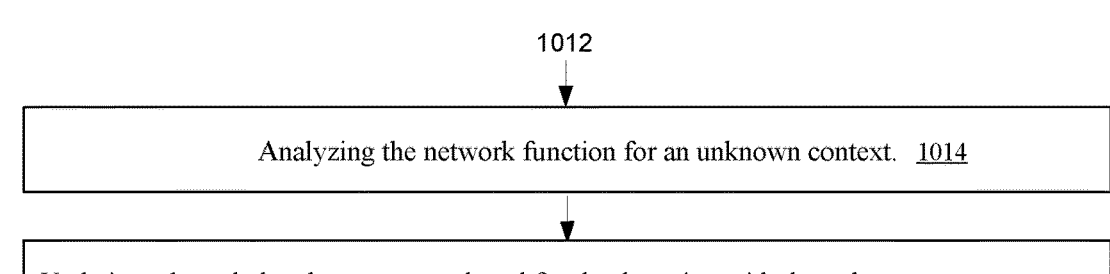

1000

1012

Analyzing the network function for an unknown context. 1014

Updating a knowledge data store employed for the detecting with the unknown context. 1016

Training the artificial intelligence model based on an additional context of the network function other than the known contexts, wherein the additional context is determined not to have been a previous input to the artificial intelligence model. 1018

Requesting synchronization of the working configuration to the specified configuration. 1020

Generating an alert to a vendor of the network function, wherein the alert comprises a notification of the inconsistency. 1022

Generating an alert to a vendor of the network function, wherein the alert comprises a notification of the inconsistency. 1024

Generating an alert to a vendor of the network function, wherein the alert comprises a notification of the inconsistency. 1026

FIG. 11

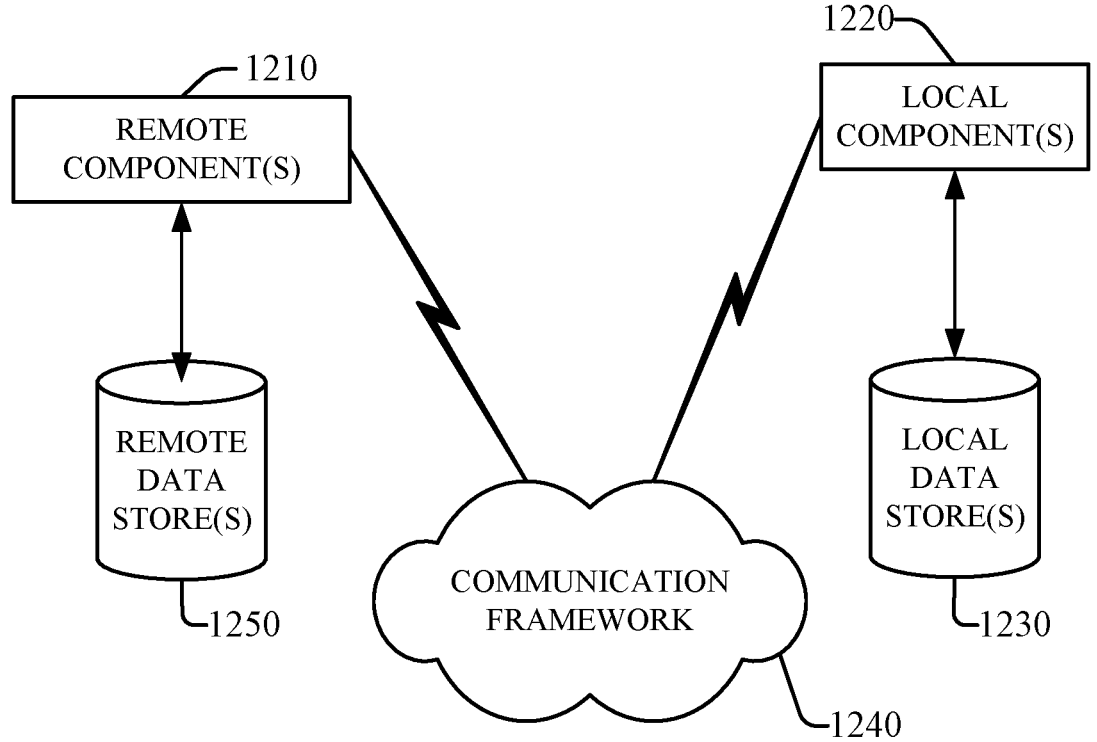
FIG. 12

PROACTIVE CONFIGURATION AUDITING IN O-RAN

BACKGROUND

Modern cellular systems continue to advance, where various components of a respective network can be disaggregated and/or managed by multiple vendors. In this way, standards and/or default configurations for various processes can be different or non-specified for different vendors. This can result in varying qualities of service for different user entities of a network, or for different vendors on the network.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Generally provided is a system for determining in-use, in-situ, dynamic and/or realtime data regarding possible network function (NF) inconsistency, such as configuration mismatch, misconfiguration, KPI degradation and/or the like.

An example system can comprise a processor, and a memory that stores executable instructions that, when executed by the processor, facilitate performance of operations, comprising determining a working configuration of a network function, and detecting a misconfiguration between a specified configuration and the working configuration of the network function, wherein the detecting is based on a context known to be associated with the misconfiguration.

An example method can comprise determining, by a system comprising a processor, respective contexts of network functions, and based on the respective contexts, predicting, by the system, a misconfiguration between respective configurations of the network functions, resulting in a predicted misconfiguration.

An exemplary non-transitory machine-readable medium, comprising executable instructions that, when executed by a processor facilitate performance of operations, comprising detecting contexts of network functions, resulting in detected contexts the network functions, analyzing the detected contexts of the network functions based on known contexts, and determining an inconsistency of a network function of the network functions based on a known context, of the known contexts, that is associated with the inconsistency.

An advantage of the one or more embodiments of the aforementioned system, method and/or non-transitory machine-readable medium can be allowing for dynamic analysis of NFs, configurations, interfaces and the like, such of mismatch and/or misconfigurations that have occurred after provisioning, or that were not caught in provisioning. This diagnosis can be employed proactively, prior to degradation of KPIs, such as based on known context that can lead to such degradation.

Another advantage of the one or more embodiments of the aforementioned system, method and/or non-transitory machine-readable medium can be definition of automatic recovery policies, such as requesting configuration transmission to one or more NFs where an alert is generated of possible mismatch and/or misconfiguration.

In one or more embodiments of the aforementioned system, method and/or non-transitory machine-readable medium, analysis of context can comprise analyzing, based on an artificial intelligence model, contexts of the network function based on stored contexts, comprising the context known to be associated with the misconfiguration, that are stored at a knowledge data store. An advantage of these one or more processes can be a learned and dynamic approach to in-situ NF configuration analysis, absent use of downtime of NFs to diagnose.

BRIEF DESCRIPTION OF THE DRAWINGS

The technology described herein is illustrated by way of example and not limited in the accompanying figures, in which like reference numerals indicate similar elements.

FIG. 10 illustrates a process flow diagram of a method of radio system diagnosis by the radio data analysis system of FIG. 3, in accordance with one or more embodiments and/or implementations described herein.

FIG. 11 illustrates a continuation of the process flow diagram of a method of radio system diagnosis by the radio data analysis system of FIG. 3, in accordance with one or more embodiments and/or implementations described herein.

FIG. 12 illustrates a block diagram of an example operating environment into which embodiments of the subject matter described herein can be incorporated.

DETAILED DESCRIPTION

Overview

Figure 1:
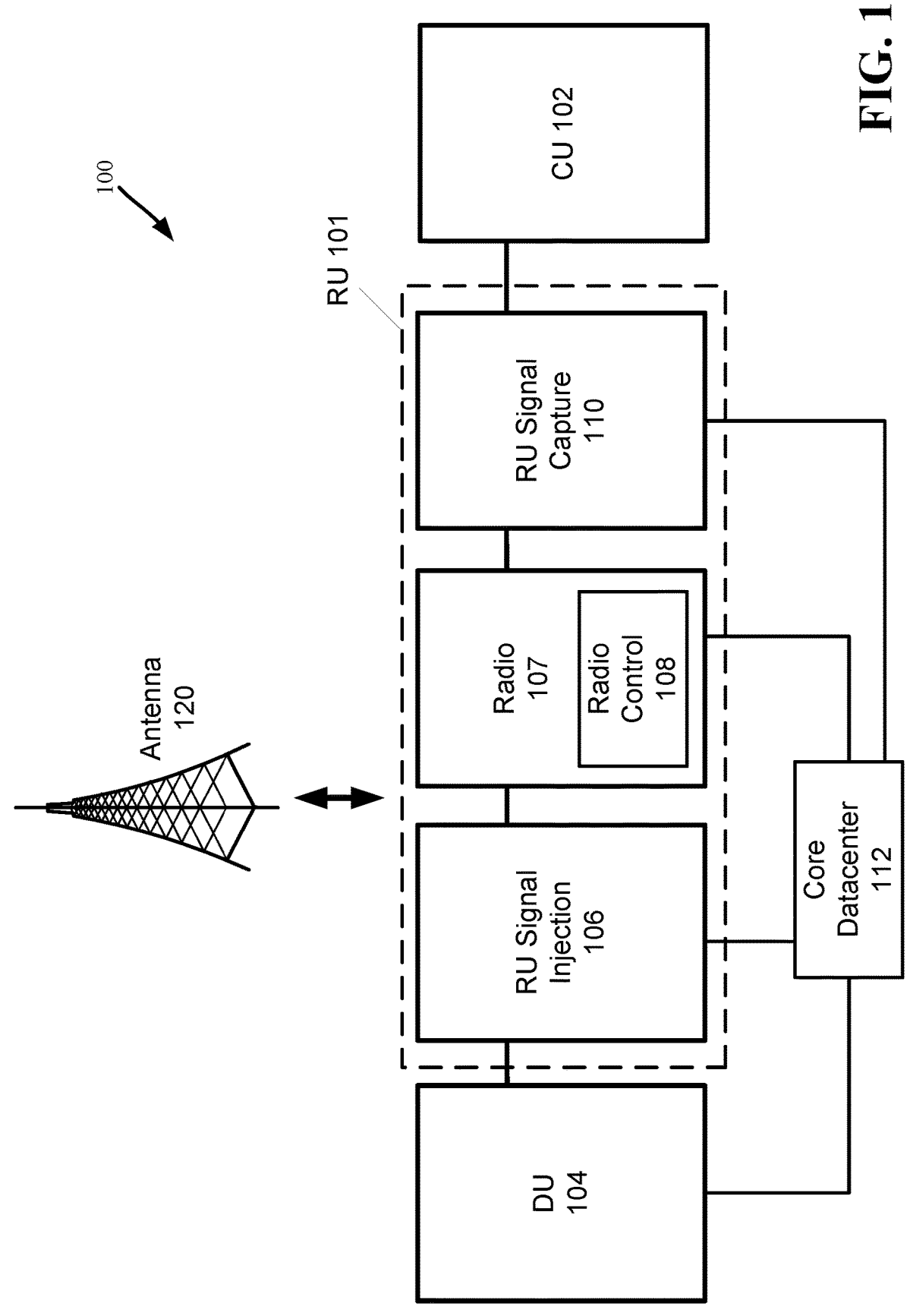
FIG. 1 illustrates a schematic representation of example elements of a radio system/network, in accordance with one or more embodiments and/or implementations described herein.

The technology described herein is generally directed towards a process to monitor network functions of a radio system for issues and/or defects, such as key performance indicator (KPI) degradation. These KPI's can comprise, but are not limited to low throughput and handover failures.

In conventional frameworks reactive diagnostics are applied after faulty configuration and/or inconsistency in configuration causes KPI degradation. Configuration inconsistency can include configuration mismatch, such as between different network functions (NFs), or between NFs and the management system (e.g., service management and orchestration module— SMO). This can be due to any one or more of software incompatibility (e.g., version mismatch), bugs between multi-vendor network elements, NF proprietary recovery actions that revert configurations to default values, missed configuration updates, non-detection of missed configuration updates, and/or missing or delayed configuration messages (e.g., missing user input or link down). One or more mismatches in configuration or context data between different NFs can result in KPI degradations such as low throughput or handover failures.

Reactive troubleshooting can be costly, requiring manpower, radio system downtime, cost and/or the like. Generally, over time, maintenance cost and network degradation is prolonged due to the reactive troubleshooting.

For example, conventional 3GPP and O-RAN specifications can focus only on detecting and handling configuration problems at the time of provisioning or when KPI degradation occurs. 3GPP and O-RAN generally rely on a localized approach where a node returns success or failure for a configuration option based on a local state of the node. With increased disaggregation in 5G and 0-RAN based architectures, this localized approach can lead to slower bad configuration detection and remedies. RAN vendors can follow a step-wise approach where configuration processes involves multiple steps that require user input and commands, and thus can be prone to user/administrator error. These steps may have to be synchronized with several disaggregates nodes in RAN. Even with mature O-RAN, issues can include chance of configuration mismatch due to internal software bugs and the disaggregated nature of the network. Also, detection and convergence can get increasingly slow and difficult at a single management node like SMO, such as with a large deployment.

To account for one or more of these deficiencies, one or more systems, methods and/or non-transitory computer readable mediums are defined herein that can provide in-situ, dynamic and/or realtime diagnostics of NF configurations and specifications, such as by analyzing systems aspects for suspected and/or probable KPI degradations. For example, a knowledge base can be employed to store a set of potential network events that can cause configuration mismatch. One or more frameworks described herein can identify and/or address such events and/or other inconsistencies, and compare/contrast/correlate them to the historical and/or stored data. These processes can be performed in a disaggregated deployment at runtime (e.g., post node recovery), such as where the NFs might belong to different vendors and thus run a higher risk of configuration mismatch. These processes can be performed across different network elements of different vendors, to thereby attempt to and/or succeed in mitigating potential configuration mismatch. For example, the one or more frameworks can trigger one or more requested recovery actions.

To provide these one or more operations and/or features, reference throughout this specification to "one embodiment," "an embodiment," "one implementation," "an implementation," etc. means that a particular feature, structure, or characteristic described in connection with the embodiment/ implementation can be included in at least one embodiment/ implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power, manual labor, thermal power, size, weight and/or the like.

As used herein, the term "resource" can refer to power, money, memory, processing power and/or the like.

Example Radio System Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 1300 illustrated at FIG. 13. In one or more described embodiments, computer and/or computing-based elements can be used in connection with implementing one or more of the systems, devices, components and/or computer-implemented operations shown and/or described in connection with FIG. 1 and/or with other figures described herein.

Turning now to FIG. 1, a high-level radio system architecture is illustrated at 100. The radio system 100 can comprise a central unit (CU) 102, distributed unit (DU) 104 (also herein referred to as a DU portion 104) and a radio unit (RU) 101. The CU 102 can comprise protocol layers and can be responsible for various protocol stack functions. The RU 101 can comprise a radio unit (RU) signal injection portion 106 (also herein referred to as an RU signal injection portion 106), the radio control 108, and an RU signal capture portion 110. Generally, the DU portion 104 can provide both baseband processing and RF functions. The RU signal capture portion 110 can take signals from a respective antenna 120 and convert the RF signal into a data signal, and vice versa. In one or more embodiments, the RU signal capture portion 110 can analyze data captured. The DU portion 104 and RU portion 106 can provide data to, and receive data from, the core datacenter 112.

Figure 2:
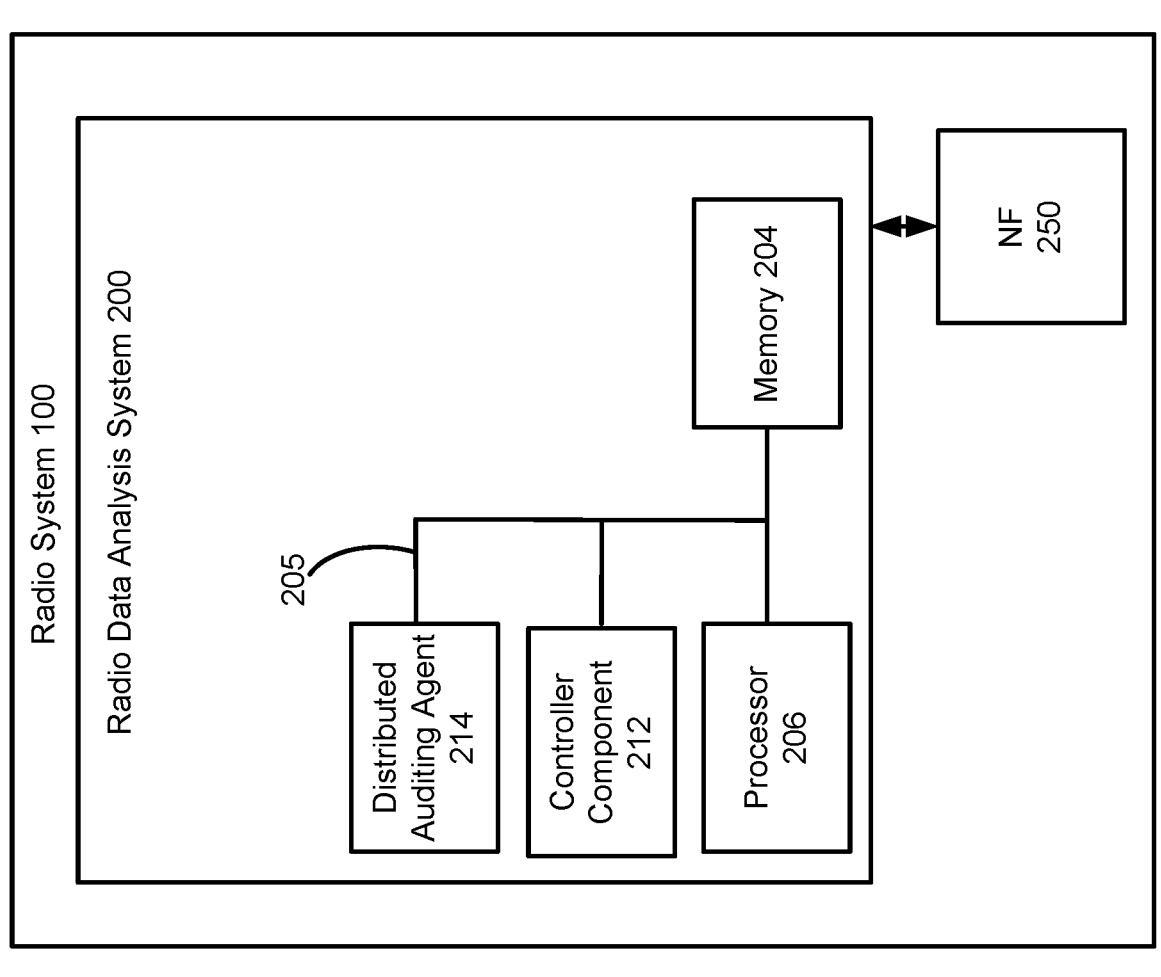
FIG. 2 illustrates another schematic representation of the radio system of FIG. 1, comprising a radio data analysis system, in accordance with one or more embodiments and/or implementations described herein.

Turning next to FIG. 2, an example of a radio system architecture is illustrated at 100, with description being provided below. The radio data analysis system 200 can be part of the radio system 100 (e.g., of FIG. 1) or can be at least partially external to the radio system 100. For purposes of brevity, additional aspects of the radio system 100 (e.g., as illustrated at FIG. 1) are not illustrated at FIG. 2. While referring here to one or more processes, operations, facilitations and/or uses of the non-limiting system architecture 200, description provided herein, both above and below, also can be relevant to one or more other non-limiting system architectures described herein.

The radio data analysis system 200 can generally detect a misconfiguration or inconsistency among NFs of a radio system, such as relative to the NF 250. As illustrated, the radio data analysis system 200 can comprise a processor 206, memory 204, bus 205, distributed auditing agent 214 and/or controller component 212. Generally, the controller component can determine a working configuration of a network function, such as NF 250. The auditing agent 214 can detect a misconfiguration between a specified configuration and the working configuration of the network function 250. The detecting can be based on a context known to be associated with the misconfiguration. The context can comprise an event, configuration, setting, KPI degradation, and/or the like.

One or more aspects of a component (e.g., the distributed auditing agent 214 and/or controller component 212) can be employed separately and/or in combination, such as employing one or more of the memory 204 or the processor 206. Additionally, and/or alternatively, the processor 206 can execute one or more program instructions to cause the processor 206 to perform one or more operations by these components. The bus 205 can enable local communication between the elements of the radio data analysis system 200.

Figure 3:
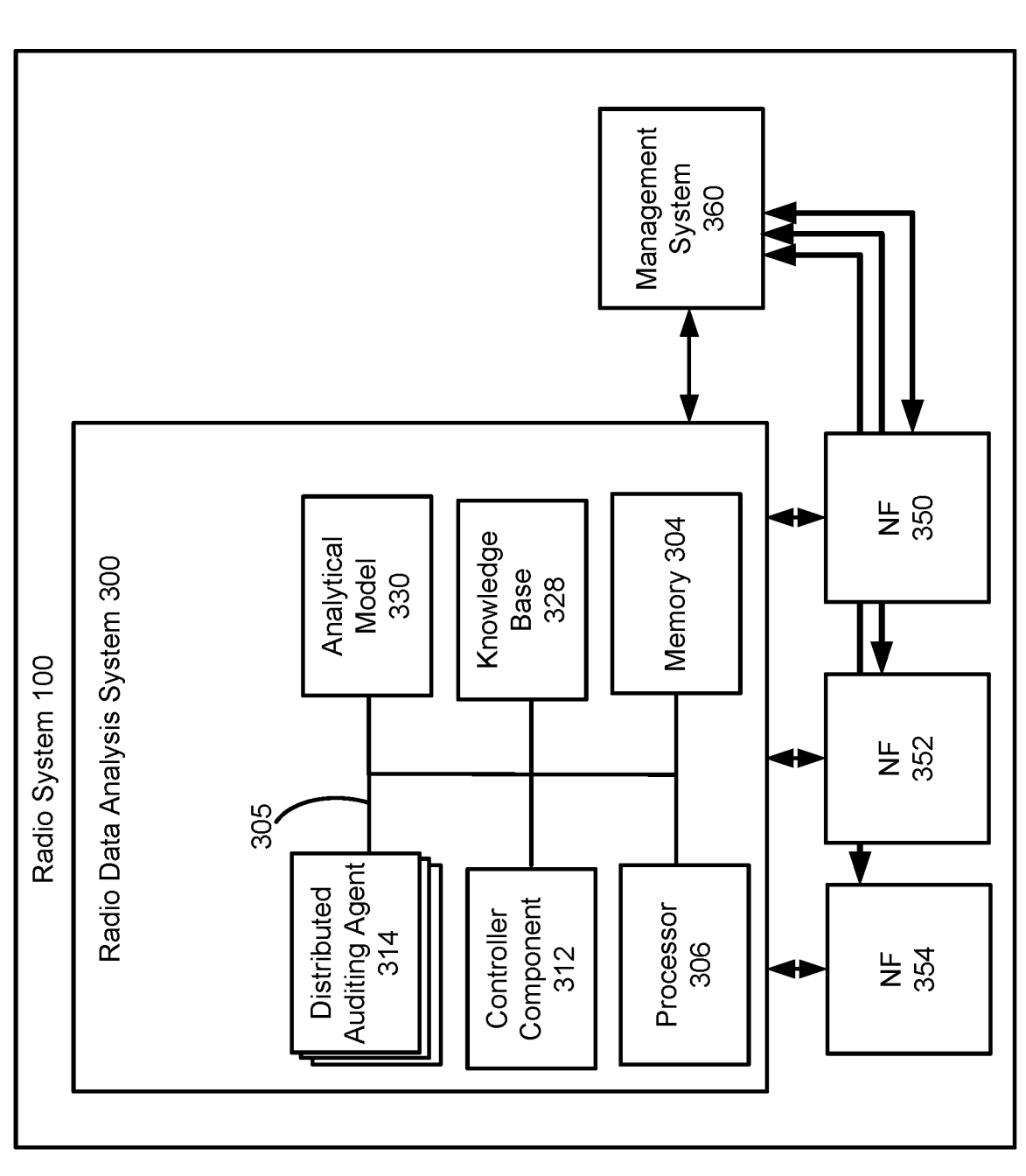
FIG. 3 illustrates another schematic representation of the radio system of FIG. 1, comprising a radio data analysis system, in accordance with one or more embodiments and/or implementations described herein.

Turning next to FIG. 3, an example of a radio system architecture is illustrated at 100, with description being provided below. The radio data analysis system 300 can be part of the radio system 100 (e.g., of FIG. 1) or can be at least partially external to the radio system 100. For purposes of brevity, additional aspects of the radio system 100 (e.g., as illustrated at FIG. 1) are not illustrated at FIG. 3. While referring here to one or more processes, operations, facilitations and/or uses of the non-limiting system architecture 300, description provided herein, both above and below, also can be relevant to one or more other non-limiting system architectures described herein.

As shown, the radio system architecture, in addition to the radio data analysis system 300, can comprise a plurality of NFs 350, 352 and 354 which can be at least partially monitored by a management system 360, which can exist at a respective management plane of the radio system architecture 100.

Generally, the radio data analysis system 300 can comprise any suitable computing devices, hardware, software, operating systems, drivers, network interfaces and/or so forth. However, for purposes of brevity, only components generally relevant to network function configurations are illustrated in FIG. 3. For example, the radio data analysis system 300 can comprise a processor 306, memory 304, bus 305, controller component 312, one or more distributed auditing agents 314, knowledge base 328 and/or analytical model 330.

Discussion first turns to the processor 306, memory 304 and bus 305 of the radio data analysis system 300.

In one or more embodiments, radio data analysis system 300 can comprise the processor 306 (e.g., computer processing unit, microprocessor, classical processor and/or like processor). In one or more embodiments, a component associated with radio data analysis system 300, as described herein with or without reference to the one or more figures of the one or more embodiments, can comprise one or more computer and/or machine readable, writable and/or executable components and/or instructions that can be executed by processor 306 to facilitate performance of one or more processes defined by such component(s) and/or instruction (s). In one or more embodiments, the processor 306 can comprise the controller component 312, one or more distributed auditing agents 314, knowledge base 328 and/or analytical model 330.

The processor 306 can be configured to control one or more components/elements of the radio data analysis system 300, such as the controller component 312, one or more distributed auditing agents 314, knowledge base 328 and/or analytical model 330.

In one or more embodiments, the radio data analysis system 300 can comprise the machine-readable memory 304 that can be operably connected to the processor 306. The memory 304 can store computer-executable instructions that, upon execution by the processor 306, can cause the processor 306 and/or one or more other components of the radio data analysis system 300 (e.g., controller component 312, one or more distributed auditing agents 314, knowledge base 328 and/or analytical model 330) to perform one or more actions. In one or more embodiments, the memory 304 can store one or more computer-executable components.

Radio data analysis system 300 and/or a component thereof as described herein, can be communicatively, electrically, operatively, optically and/or otherwise coupled to one another via a bus 305 to perform functions of non-limiting system architecture 100, radio data analysis system 300 and/or one or more components thereof and/or coupled therewith. Bus 305 can comprise one or more of a memory bus, memory controller, peripheral bus, external bus, local bus and/or another type of bus that can employ one or more bus architectures. One or more of these examples of bus 305 can be employed to implement one or more embodiments described herein.

In one or more embodiments, radio data analysis system 300 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 100 can reside in the cloud, and/or can reside locally in a local computing environment (e.g., at a specified location(s)).

In addition to the processor 306 and/or memory 304 described above, radio data analysis system 300 can comprise one or more computer and/or machine readable, writable and/or executable components and/or instructions that, when executed by processor 306, can facilitate performance of one or more operations defined by such component(s) and/or instruction(s).

Figure 4:
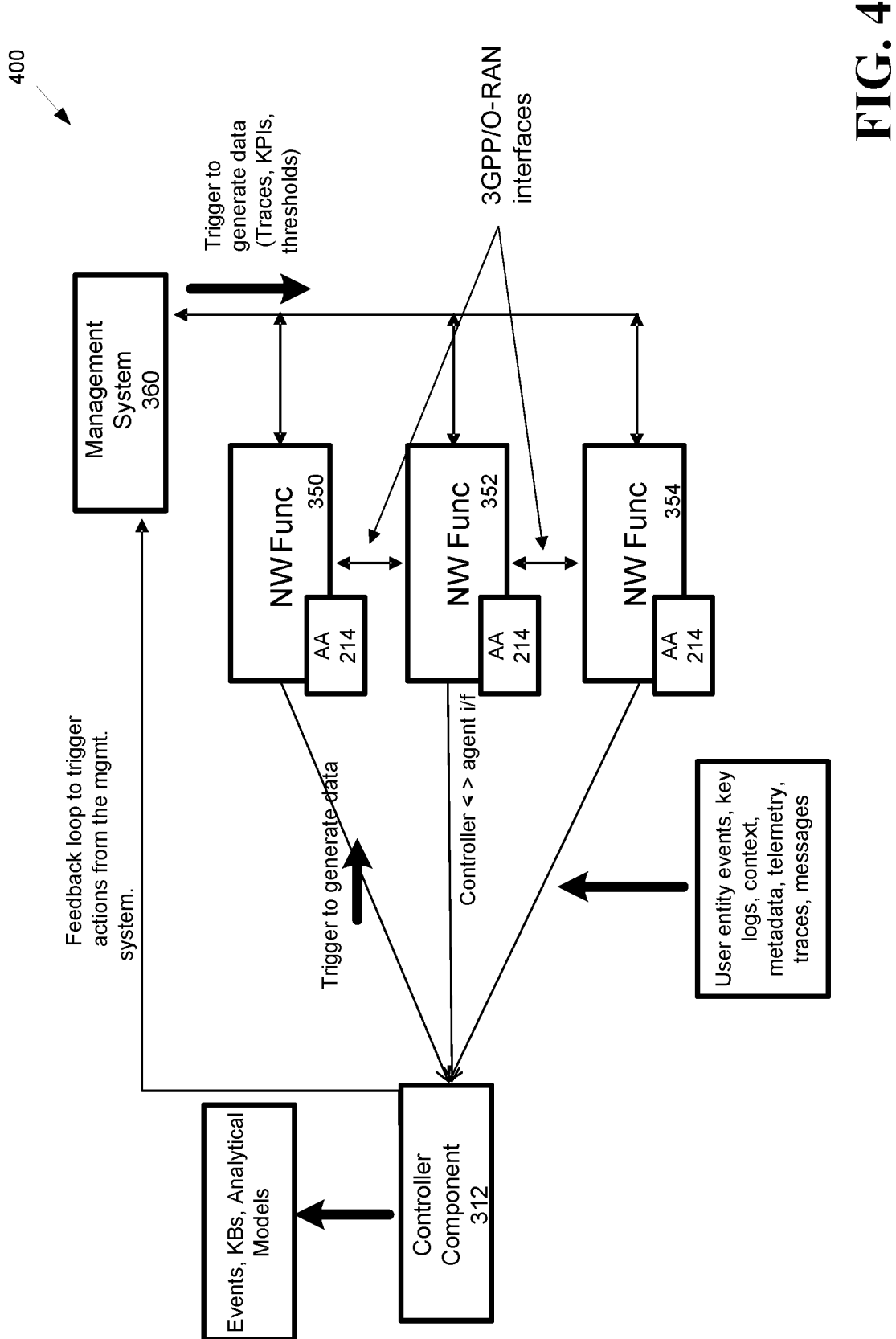
FIG. 4 illustrates a partial schematic diagram of the radio data analysis system of FIG. 3, in accordance with one or more embodiments and/or implementations described herein.

Turning now to additional elements of the radio data analysis system 300, and also to FIG. 4 in addition to FIG. 3, the controller component 312 can determine a working configuration of an NF 350, 352, 354. Additionally, the controller component 312 can host the knowledge base 328, and/or perform proactive auditing and knowledge base updates based on signals from the distributed auditing agents 314.

The knowledge base 328 can be disposed at the radio data analysis system 300 as illustrated, and/or can be external to the radio data analysis system 300 and/or radio system 100. Additional knowledge bases can be employed by the radio data analysis system 300 where applicable.

In one example, such knowledge base 328 can comprise a set of events that have correlation or causality with configuration mismatch. The events can be represented by 3GPP, and/or O-RAN defined interfaces (e.g., O1, F1, . . . etc.) and their management plane related messages. In one or more examples, additional context can comprise user entity (UE) events, key logs, metadata, telemetry, traces and/or the like.

The knowledge base 328 can be initialized by an administrating entity. The knowledge base 328 can be updated, such as periodically and/or upon detection of KPI degradation, to add new events, such as dynamically in-situ/during runtime, to be described in greater detail below. In one or more embodiments, such new events and/or messages can be collected by 3GPP defined trace messages.

The auditing agents (AA) 314 can generally register to one or more interfaces available to a host NF of the AA 314. That is, an AA 314 can be paired with an NF 350, 352, 354. Generally, the AAs 314 can report to the controller component 312 upon detection of a context relating to possible KPI degradation. Such context can be any specified event, message and/or the like of a knowledge base 328. As indicated above, such context can comprise an event and/or message that can lead to low throughput and/or handover failure.

It is appreciated that interfaces can be either extended (e.g., existing O-RAN or 3GPP interfaces), such as if the controller component 312 is hosted at the management system 360, or a new interface can be employed for one or more of the auditing agents 314/controller component 312 communications.

In one or more embodiments, the contexts can be detected based an analysis output by an analytical model 330 (also herein referred to as an artificial intelligence model). The analytical model 330 can be employed by the AAs 314 and/or receive information from the AAs regarding current conditions, configurations, KPIs and/or the like of the NFs and/or other aspects of the radio system 100. Based on learned context (e.g., events, messages and/or the like) that can be known to lead to and/or proceed KPI degradation, and/or based on such context defined at one or more knowledge bases (e.g., 328), the analytical model 330 can perform analysis. The analysis can comprise comparison, contrasting and/or determination of correlation between any of the aforementioned contexts and the current data provided by the AAs 314.

A mismatch, issue and/or misconfiguration can be detected based on a non-correlation between the known contexts and the current data provided by the AAs 314. Indeed, the current data can be provided at realtime, dynamically, such as during use of the NFs by the radio system 100, such as absent downtime being employed for the NFs.

Generally, the mismatch, issue and/or configuration can be reported to the controller component 318, such as by the respective auditing agent 314 that can receive a report from the analytical model 330.

The analytical model 330 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised. For example, the analytical model 330 can comprise a ML model.

Generally, the analytical model 330 can be trained, such as by the controller component 312, on a set of training data that can represent the type of data for which the system will be used. That is, the analytical model 330 can be trained on historical radio resource allocations, bandwidths, levels of QoS and/or other KPIs that can be known to lead to and/or proceed misconfiguration, KPI degradation and/or the like.

Alternatively, it will be appreciated that the radio data analysis system 300 can function absent use of the analytical model 330, such as based on comparison of data from AAs relative to listed known contexts, such as from a knowledge base 328. For example, a configuration check/auditing can be proactively performed periodically, based on a request by the operator or when one KPI degradation is detected at one of the NFs.

Figure 5:
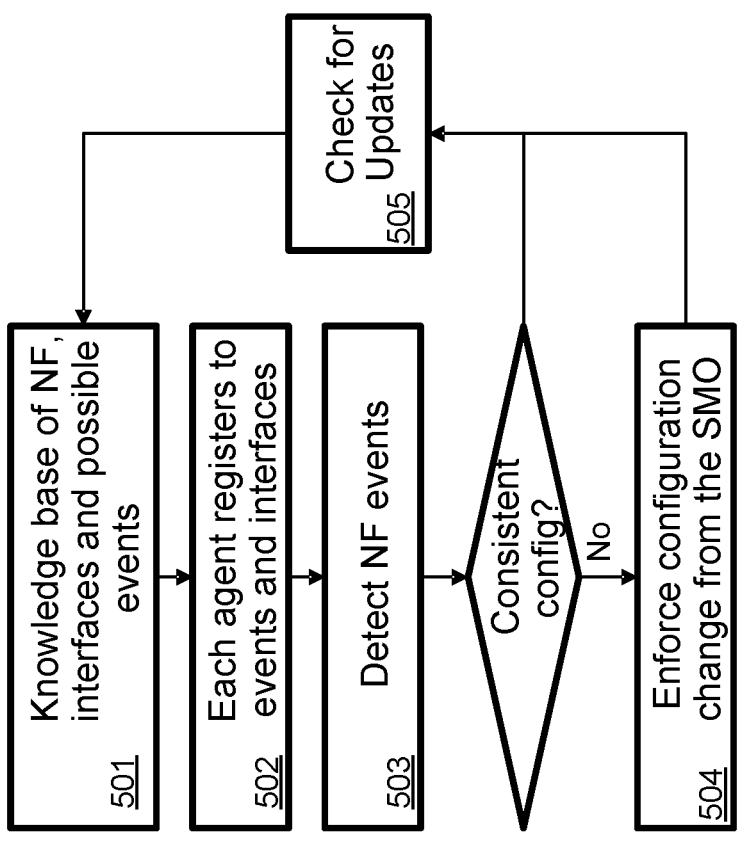
FIG. 5 illustrates a partial schematic diagram of general processes performed by the radio data analysis system of FIG. 3, in accordance with one or more embodiments and/or implementations described herein.

In view of general understanding of the radio data analysis system 300, direction now turns to FIG. 5, which illustrates a set of high level operations is illustrated relative to FIGS. 3 and 4 for monitoring and diagnosing a misconfiguration at a radio system, such as among one or more NFs of the radio system, in accordance with one or more embodiments described herein. One or more elements, objects and/or components referenced in the process flow 500 can be those of system 100 and/or system 300. Repetitive description of like elements and/or processes employed in respective embodiments is omitted for sake of brevity. Likewise, the processes and/or operations of the process flow 500 also can be applicable to the system 200.

At operation 501, the process flow 500 can comprise providing a knowledge base of NFs, interfaces and possible context (e.g., events, messages, traces, telemetry, metadata, logs, UE events and/or the like). The knowledge base 328, for example, can be initialized by an administrating system, an SMO, and/or other system integrator, based on domain knowledge. The knowledge database 328 can provide a baseline to the controller component 312 to monitor certain events on existing interfaces. That is, such events can be known to have the potential of generating and/or leading to configuration mismatches, issues and/or the like. This can be followed by discrepancy between configurations of different NFs, such as managed by different vendors.

At operation 502, the process flow 500 can comprise registering a listener, such as an AA 314 to interfaces, NFs and/or the like. Likewise, the controller component 318 can register as a listener to all or a subset of messages over the corresponding interfaces.

At operation 503, the process flow 500 can comprise detecting real time, in-use, and/or current context. Operation 503 further can comprise comparison of such context to the knowledge database 328, which can include employing the analytical model 330. Generally, operation 503 can comprise identifying impacted databases and interfaces during such identified events, and retrieving metadata form different NFs and performing consistency checks to detect the context of mismatch/misconfiguration. In this way, configuration data of NFs can be proactively retrieved and analyzed, accounting for one or more deficiencies in provisioning of the NFs.

At operation 504, the process flow 500 can comprise enforcing a configuration that can account for and/or resolve a mismatch, misconfiguration and/or the like. The enforcement can comprise any one or more of generating an alert, requesting a configuration enforcement, and/or executing the configuration enforcement. In one example, in the case of an inconsistency (e.g., mismatch and/or misconfiguration) among the NFs (e.g., between NFs and/or between an NF and a default configuration or specified configuration), a configuration can be retrieved from the SMO 360 and transmitted to the affected NF, such as by the controller component 312.

At operation 505, the process flow 500 can comprise analysis of the knowledge base 328 and/or analytical model 330 for updates and/or unknown or unspecified context. Likewise, operation 505 can comprise updating of the knowledge base 328 and/or training of the analytical model 330 where a new context is determined.

Figure 6:
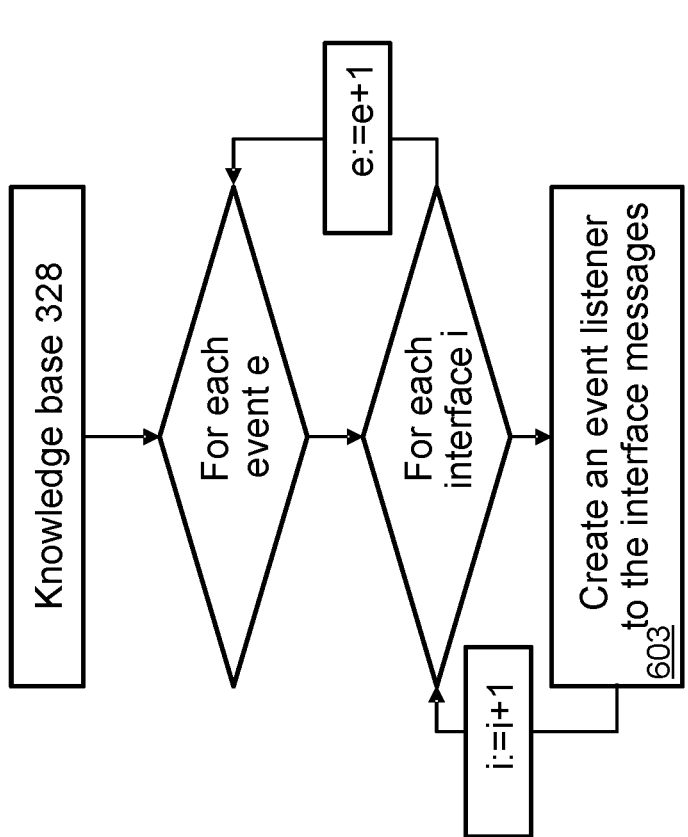
FIG. 6 illustrates a partial schematic diagram of a processes performed by the radio data analysis system of FIG. 3, in accordance with one or more embodiments and/or implementations described herein.

Turning now to FIG. 6, a process flow is illustrated providing additional details relative to operations 501 and 502 of FIG. 5. As illustrated using a knowledge base 328, the system 300 can provide registered AAs 314 for various interfaces of the radio system 100 (e.g., operation 603). The system 300 further can determine various determined events e (e.g., determined by the AAs 314) for various interfaces registered to by the AAs 314. One or more examples of events e can comprise Netconf configuration/reconfiguration messages, NF lost connection to SMO or other NFs, call home or NF discover, NF reprovisioning, and/or the like. Example interfaces registered to can comprise O-RAN and 3GPP interfaces such as OAM interface (O1), CU-DU interface (F1) and CU-CP to CU-UP interface (E1). The NFs employed can comprise distributed units, central units and/or radio units.

Figure 7:
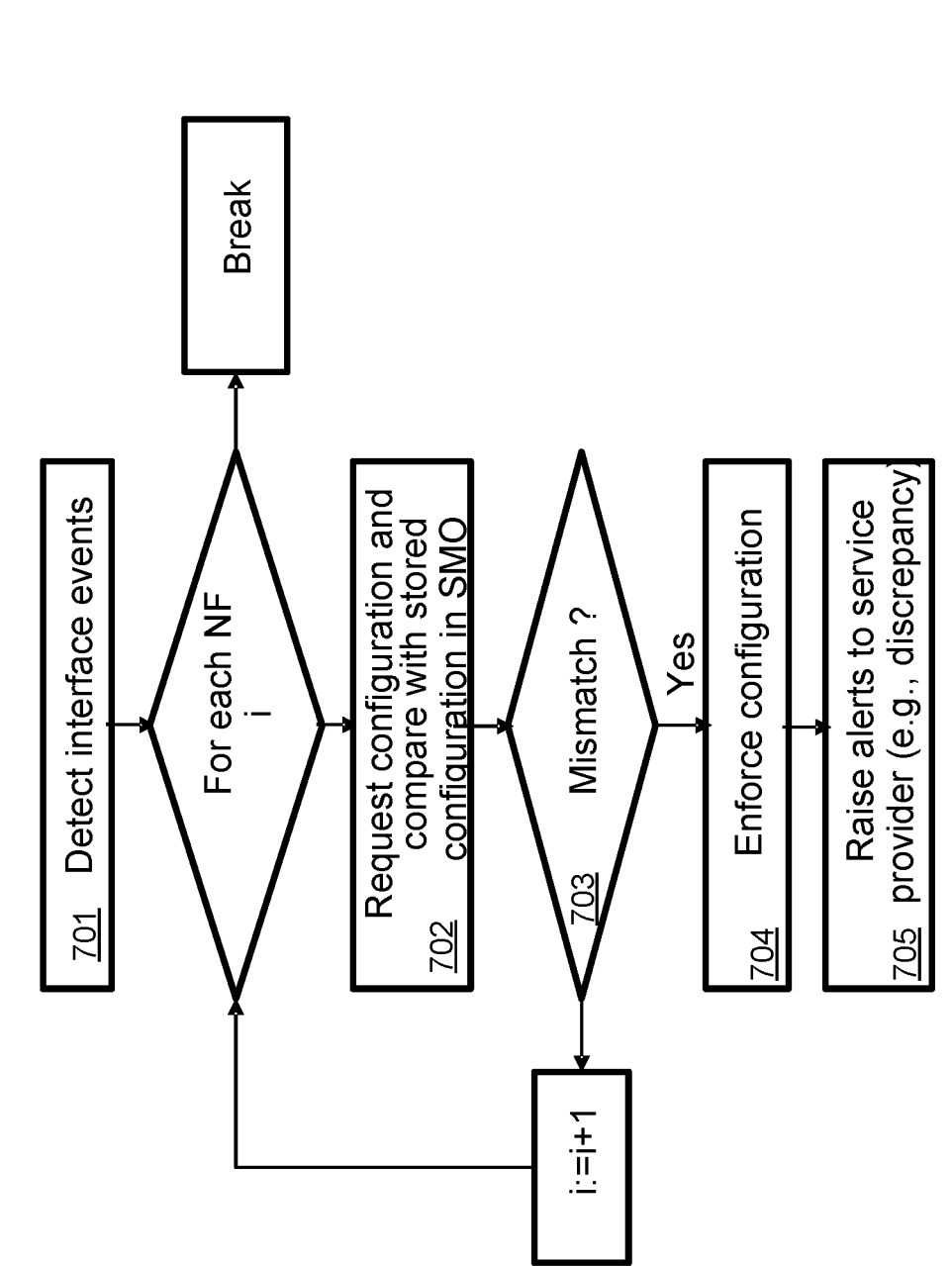
FIG. 7 illustrates a partial schematic diagram of a processes performed by the radio data analysis system of FIG. 3, in accordance with one or more embodiments and/or implementations described herein.

Turning now to FIG. 7, a process flow is illustrated providing additional details relative to operations 503 and 504 of FIG. 5. At operation 701, the listener to each interface can detect relevant events, such as if any of the corresponding messages were exchanged between NFs being diagnosed. For each NF, at operation 702, the system 300 (e.g., AA 314) can request the configuration of all NF parameters from both SMO and the NF (e.g., CU). If the value of at least one parameter in both configurations is not matching, then a mismatch can be detected at operation 703. At operation 704, an SMO configuration can be pushed, and/or requested for push, to the NF at issue. At operation 705, an alert to the service provider can be raised including a request for further troubleshooting.

Figure 8:
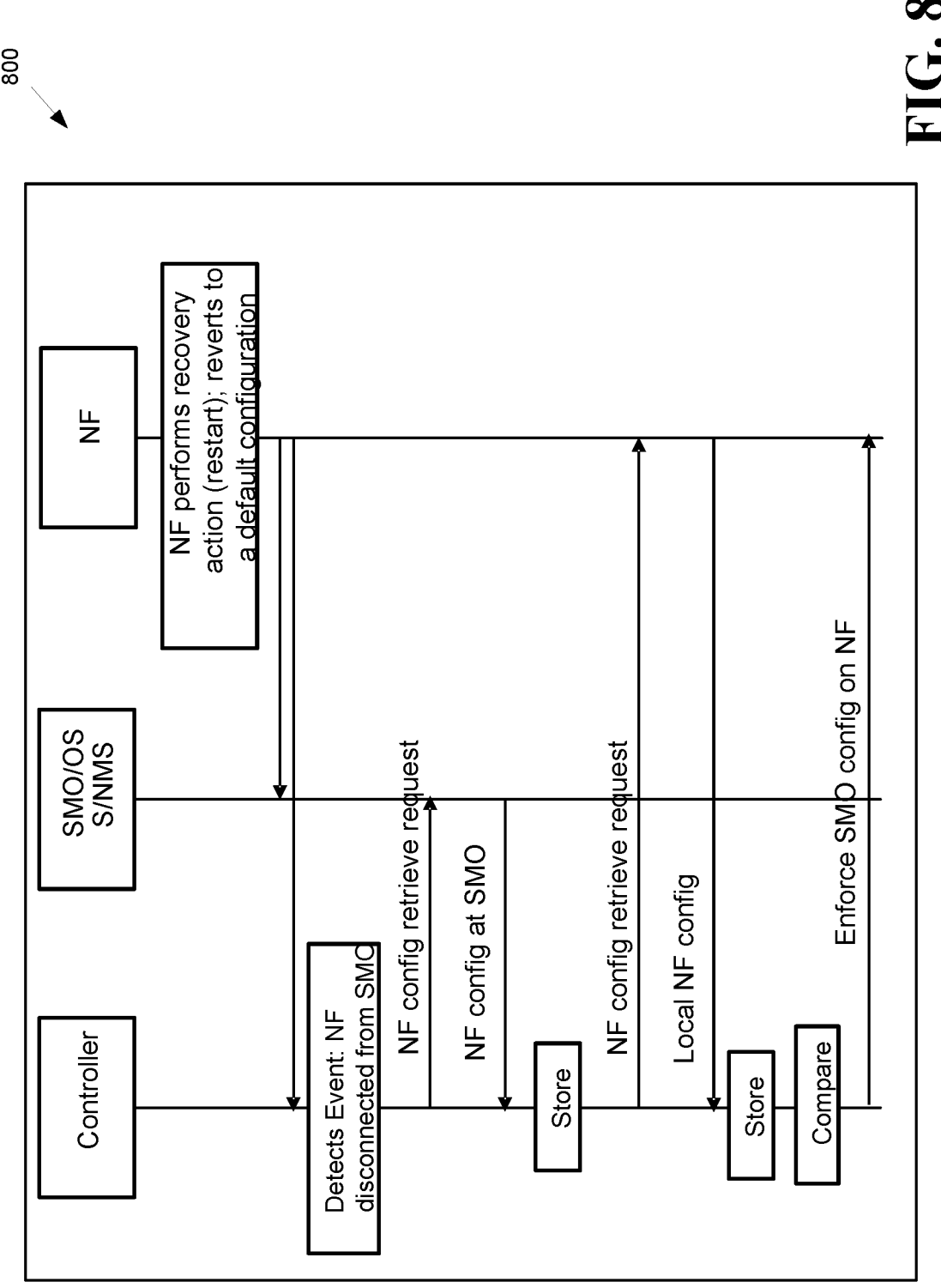
FIG. 8 illustrates a partial schematic diagram of a processes performed by the radio data analysis system of FIG. 3, in accordance with one or more embodiments and/or implementations described herein.

Turning now to FIG. 8, a signal diagram is illustrated providing proposed solution steps that can occur based on and/or as part of operations 503 and 504 of FIG. 5. Generally, the controller (e.g., controller component 312) can receive a NF reset notification which can one of the events in the knowledge base 328 or which the analytical model 330 is trained on. The controller can query NF's configuration from the SMO (e.g., management system 360). Once the NF is up, the controller can query NF's configuration from the corresponding knowledge base entry. The controller can compare the two configurations and if a mismatch is found then the controller can take actions to synchronize the configuration.

Figure 9:
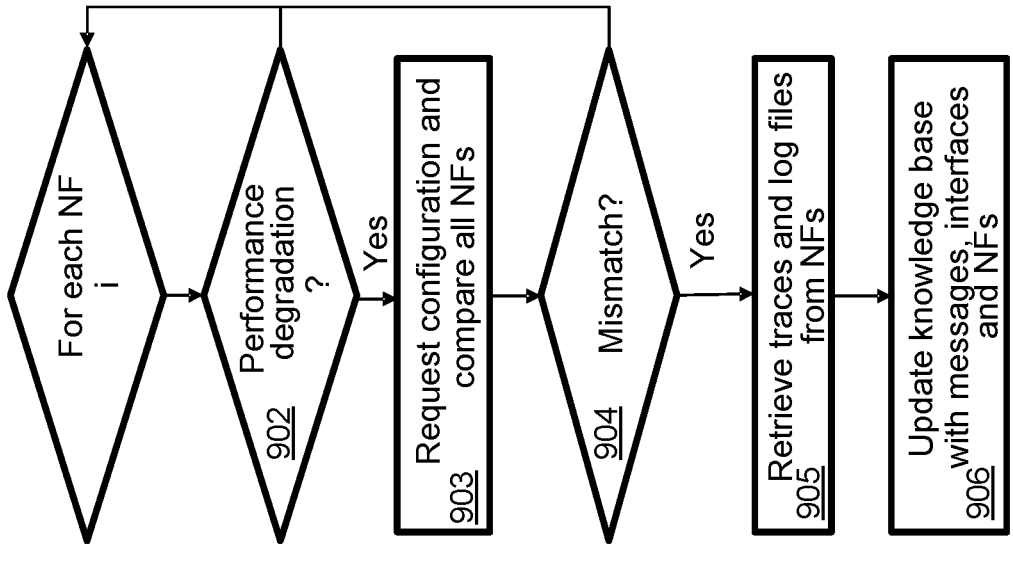
FIG. 9 illustrates a partial schematic diagram of a processes performed by the radio data analysis system of FIG. 3, in accordance with one or more embodiments and/or implementations described herein.

Turning now to FIG. 9, a process flow is illustrated providing additional details relative to operation 505 of FIG.

5. In the case of missing events from the knowledge base 328 and/or analytical model 330, proactive detection of configuration mismatch can be hindered. Generally, the framework of FIG. 9 aims to update the knowledge base 328 and/or analytical model 330 during run time, such as by adding more events and/or other context that are typically followed by configuration mismatch.

For example, an undesired performance degradation can be determined at operation 902. This undesired performance degradation can have occurred if a new context was unknown, and thus not detected. Thus a recovery policy may not have been employed, leading to the undesired performance degradation. Next, a configuration mismatch can be determined at a following operation 904, such as based on requested configurations of NFs and comparison there (e.g., by the analytical model 330 and/or AAs 314) at operation 903.

For example, for each NF, a set of predefined KPI context can be used to detect configuration mismatch. CU-related KPIs can comprise handover success rate, number of connected users, RRC connection setup request and/or radio resource channel (RRC) reestablishment success rate. DU-related KPIs can comprise average over the air throughput. RU-related KPIs can comprise physical resource block (PRB) utilization.

If the value of at least one parameter in both (e.g., two NFs and/or an NF and a default/preferred configuration at SMO) configurations is not matching, then a mismatch which was not captured by the knowledge base 328 and/or analytical model 330 can be detected.

At operation 906, a new entry containing the NFs of degraded KPIs and configuration mismatch can added to the knowledge base 328 and/or the analytical model 330 trained therein. The entry further can comprise the interface messages (e.g., from trace files) that took place right after the undesired performance degradation. The messages can be retrieved by enabling and collecting cell traces defined in 3GPP, for example, at operation 905.

In response to the undesired performance degradation and subsequent identification of configuration mismatch, the system 300 (e.g., control component 318) can push the current/desired SMO configuration to the NF and/or raise an alert to the service provider for further troubleshooting.

Turning now to FIGS. 10 and 11, a process flow comprising a set of operations is illustrated relative to FIGS. 3 and 4 for monitoring and diagnosing a misconfiguration at a radio system, such as among one or more NFs of the radio system, in accordance with one or more embodiments described herein. One or more elements, objects and/or components referenced in the process flow 1000 can be those of system 100 and/or system 300. Repetitive description of like elements and/or processes employed in respective embodiments is omitted for sake of brevity. Likewise, the processes and/or operations of the process flow 1000 also can be applicable to the system 200.

At operation 1002, the process flow 1000 can comprise determining a working configuration of a network function.

At operation 1004, the process flow 1000 can comprise detecting contexts, comprising the context, of a group of network functions, comprising the network function.

At operation 1006, the process flow 1000 can comprise analyzing the contexts of the group of network functions based on known contexts.

At operation 1008, the process flow 1000 can comprise determining an inconsistency of the network function based on a known context, of the known contexts, associated with the inconsistency. The inconsistency can be known to be associated with misconfiguration between network functions, comprising the network function.

At operation 1010, the process flow 1000 can comprise detecting a misconfiguration between a specified configuration and the working configuration of the network function, wherein the detecting is based on a context known to be associated with the misconfiguration At operation 1012, the process flow 1000 can comprise analyzing, based on an artificial intelligence model, contexts of the network function based on stored contexts, comprising the context known to be associated with the misconfiguration, that are stored at a knowledge data store.

At operation 1014, the process flow 1000 can comprise analyzing the network function for an unknown context.

At operation 1016, the process flow 1000 can comprise updating a knowledge data store employed for the detecting with the unknown context.

At operation 1018, the process flow 1000 can comprise training the artificial intelligence model based on an additional context of the network function other than the known contexts, wherein the additional context is determined not to have been a previous input to the artificial intelligence model.

At operation 1020, the process flow 1000 can comprise requesting synchronization of the working configuration to the specified configuration.

At operation 1022, the process flow 1000 can comprise generating an alert to a vendor of the network function, wherein the alert comprises a notification of the inconsistency.

At operation 1024, the process flow 1000 can comprise sending, by the system, a notification of the predicted misconfiguration to a device associated with a vendor of one of the respective configurations At operation 1026, the process flow 1000 can comprise wherein the network function is enabled using an open radio access network protocol or at least a fifth generation (5G) communication network protocol.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of diagrams 1100 are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein can employ dynamically changing network variables and/or context, in realtime, to determine one or more possible contexts that can lead to NF misconfiguration, NF mismatch and/or KPI degradation. In an embodiment, an example system can comprise a processor, and a memory that stores executable instructions that, when executed by the processor, facilitate performance of operations, comprising determining a working configuration of a network function, and detecting a misconfiguration between a specified configuration and the working configuration of the network function, wherein the detecting is based on a context known to be associated with the misconfiguration. Analysis of context can comprise analyzing, based on an artificial intelligence model, the contexts of the network function as compared to known and/or stored contexts.

An advantage of the one or more embodiments of the aforementioned system, method and/or non-transitory machine-readable medium can be allowing for dynamic analysis of NFs, configurations, interfaces and the like, such of mismatch and/or misconfigurations that have occurred after provisioning, or that were not caught in provisioning. This diagnosis can be employed proactively, prior to degradation of KPIs, such as based on known context that can lead to such degradation.

Another advantage of the one or more embodiments of the aforementioned system, method and/or non-transitory machine-readable medium can be definition of automatic recovery policies, such as requesting configuration transmission to one or more NFs where an alert is generated of possible mismatch and/or misconfiguration.

In one or more embodiments of the aforementioned system, method and/or non-transitory machine-readable medium, analysis of context can comprise analyzing, based on an artificial intelligence model, contexts of the network function based on stored contexts, comprising the context known to be associated with the misconfiguration, that are stored at a knowledge data store. An advantage of these one or more processes can be a learned and dynamic approach to in-situ NF configuration analysis, absent use of downtime of NFs to diagnose.

A practical application of the systems, computer-implemented methods and/or non-transitory computer-readable mediums described herein can be post-provisioning and/or realtime analysis of NF configurations, behavior and/or functioning, such as to identify configuration issues prior to one or more KPI degradations. Overall, such computerized tools can constitute a concrete and tangible technical improvement in the field of radio system diagnostics, without being limited thereto.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide dynamic and adaptable radio system diagnosis, as compared to existing systems and/or techniques. Systems, computer-implemented methods and/or computer program products facilitating performance of these processes are of great utility in the fields of radio network and radio system diagnostics and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively analyze network conditions, predict configuration issues, and/or automatically determine a recovery policy in the time that one or more embodiments described herein can facilitate these processes. And, neither can the human mind nor a human with pen and paper electronically perform one or more of these processes as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

FIG. 12 is a schematic block diagram of an operating environment 1200 with which the described subject matter can interact. The operating environment 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The operating environment 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The operating environment 1200 comprises a communication framework 1240 that can be employed to facilitate communications between the remote component(s) 1210 and the local component(s) 1220, and can comprise an air interface, e.g., interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Example Computing Environment

Figure 13:
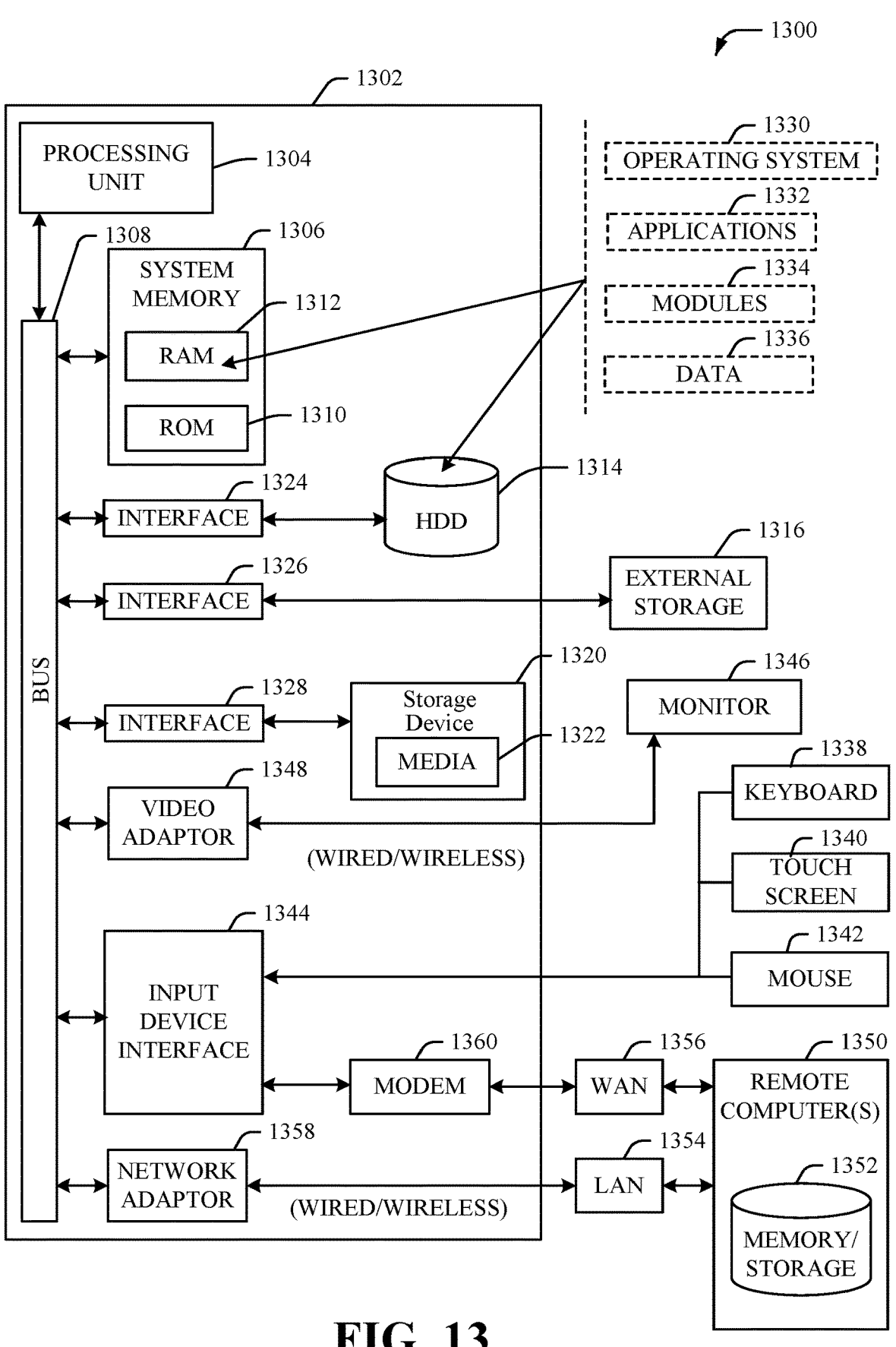
FIG. 13 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 13, the example computing environment 1300 which can implement one or more embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multiprocessor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in the computing environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. The network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, comprising:

detecting an event at an interface of a radio system, wherein the interface corresponds to a registered auditing agent of the radio system, wherein the radio system comprises an open radio access network protocol or at least a fifth generation (5G) communication network protocol, and wherein the event corresponds to a possible degradation of a key performance indicator (KPI) of the radio system;

comparing, by an analytical model employing artificial intelligence, event data defining the event with known context data at a knowledge database, wherein the known context data defines known network function configurations associated with known events that correspond to KPI degradation;

matching first known context data, of the known context data, with the event data;

based on the comparing, identifying a network function hosted by the interface and defined at the first known context data as being associated with a known event of the known events; and detecting an inconsistency between a known configuration, of the known network function configurations, of the network function that is defined by the first known context data, and a working configuration of the network function presently operating at the radio system, wherein the inconsistency is associated with a misconfiguration between at least two of the group of network functions, comprising the network function, and wherein the misconfiguration is based on the inconsistency.

2. The system of claim 1, wherein the detecting of the event at the interface of the radio system comprises:

detecting contexts, comprising a context defining the event, of a group of network functions hosted by the interface, comprising the network function.

3. The system of claim 2, wherein the operations further comprise:

determining the inconsistency of the network function based on the first known context data associated with the inconsistency.

4. The system of claim 1, wherein the operations further comprise:

analyzing the network function for an unknown context; and updating the knowledge database with the unknown context.

5. The system of claim 1, wherein the operations further comprise:

requesting synchronization of the working configuration to a specified configuration for the network function.

6. The system of claim 1, wherein the operations further comprise:

querying a service management and orchestration (SMO) element of the radio system for the working configuration of the network function; and in connection with the querying of the SMO element, querying the knowledge database for the known network function configuration.

7. The system of claim 1, wherein the detecting of the event is performed at a specified periodicity unassociated with and prior to a degradation of the KPI.

8. A non-transitory machine-readable medium, comprising executable instructions that, when executed by at least one processor facilitate performance of operations, comprising:

detecting an event at an interface of a radio system, wherein the interface corresponds to a registered auditing agent of the radio system, wherein the radio system comprises an open radio access network protocol or at least a fifth generation (5G) communication network protocol, and wherein the event corresponds to a possible degradation of a key performance indicator (KPI) of the radio system;

matching, by an analytical model employing an artificial intelligence process, event data defining the event with first known context data, of known context data at a knowledge database, wherein the known context data defines network function inconsistencies;

based on the matching, identifying a first network function hosted by the interface and defined at the first known context data as being associated with a known event of the known events;

determining an inconsistency, of the inconsistencies, of the first network function based on the first known context;

querying a service management and orchestration (SMO) element of the radio system for a working configuration of the first network function presently operating at the radio system;

based on the determining of the inconsistency of the first network function, querying the SMO element for a working configuration of a second network function different from the first network function; and comparing the working configurations of the first network function and the second network function.

9. The non-transitory machine-readable medium of claim 8, wherein the inconsistency associated with a misconfiguration between the first network function and the second network function.

10. The non-transitory machine-readable medium of claim 8, wherein the operations executed by the processor further comprise:

prior to the matching, by the analytical model, training the analytical model based on an additional context of the first network function other than the known contexts, wherein the additional context is determined not to have been a previous input to the analytical model.

11. The non-transitory machine-readable medium of claim 8, wherein the operations executed by the processor further comprise:

generating an alert to a vendor of the first network function, wherein the alert comprises a notification of the inconsistency; and generating a request to synchronize the working configuration to a specified configuration.

12. The non-transitory machine-readable medium of claim 8, wherein the operations executed by the processor further comprise:

predicting the inconsistency as being between a known network function configuration of the first network function and a working configuration of the first network function;

and in connection with the querying of the SMO element, querying the knowledge database for the known network function configuration of the first network function.

13. The non-transitory machine-readable medium of claim 8, wherein the detecting of the event is performed at a specified periodicity unassociated with and prior to a degradation of the KPI.

14. A method, comprising:

detecting, by a system comprising at least one processor, an event at an interface of a radio system, wherein the interface corresponds to a registered auditing agent of the radio system, wherein the radio system comprises an open radio access network protocol or at least a fifth generation (5G) communication network protocol, and wherein the event corresponds to possible degradation of a key performance indicator (KPI) of the radio system;

comparing, by an analytical model employing artificial intelligence, of the system, event data defining the event with known context data at a knowledge database, wherein the known context data defines known network function configurations associated with known events that correspond to KPI degradation;

matching, by the system, the first known context data, of the known context data, with the event data;

based on the comparing, identifying, by the system, network functions hosted by the interface and defined at the first known context data as being associated with a known event of the known events;

determining, by the system, respective contexts of the network functions; and based on the respective contexts, predicting, by the system, a misconfiguration between respective working configurations of the network functions, resulting in a predicted misconfiguration;

querying, by the system, a service management and orchestration (SMO) element of the radio system for the respective working configurations of the network functions presently operating at the radio system; and in connection with the querying of the SMO element, querying, by the system, the knowledge database for respective known network function configurations, of the known network function configurations, corresponding to the network functions and that are defined by the first known context data;

wherein the comparing the event data comprises comparing working configurations for the network functions, and comparing the working configurations with the respective known network function configurations corresponding to the network functions, and wherein the predicting the misconfiguration is based on respective results of the querying of the SMO element and of the querying of the knowledge database.

15. The method of claim 14, further comprising:

in connection with the matching, comparing, by the system, the respective contexts to known contexts that are known to lead to the misconfiguration between the working configurations of at least two of the network functions.

16. The method of claim 14, further comprising:

requesting, by the system, synchronization of the working configurations; and sending, by the system, a notification of the predicted misconfiguration to a device associated with a vendor of at least one of the network functions.

17. The method of claim 14, further comprising: evaluating, by the system, the respective contexts relative to a threshold, wherein the performing of the predicting of the misconfiguration is based on at least one of the respective contexts satisfying a function defined with respect to the threshold.

* * * * *